United States Patent [19]
Leggett, III

[11] Patent Number: 6,084,826
[45] Date of Patent: Jul. 4, 2000

[54] MEASUREMENT-WHILE-DRILLING ACOUSTIC SYSTEM EMPLOYING MULTIPLE, SEGMENTED TRANSMITTERS AND RECEIVERS

[75] Inventor: James V. Leggett, III, Houston, Tex.

[73] Assignee: Baker Hughes Incorporated, Houston, Tex.

[21] Appl. No.: 09/084,769

[22] Filed: May 26, 1998

Related U.S. Application Data

[63] Continuation of application No. 08/371,879, Jan. 12, 1995, abandoned.

[51] Int. Cl.[7] .................................................. H04H 9/00
[52] U.S. Cl. .............................. 367/82; 367/81; 367/25; 340/855.5; 181/102
[58] Field of Search ........................ 340/853.1, 853.3, 340/854.1, 856.4, 855.4, 855.5, 855.6; 367/83, 86, 25, 35, 82, 81; 181/102, 103, 104

[56] References Cited

U.S. PATENT DOCUMENTS

| | | |
|---|---|---|
| 4,641,724 | 2/1987 | Chow et al. . |
| 4,692,908 | 9/1987 | Ekstrom et al. . |
| 5,036,945 | 8/1991 | Hoyle et al. . |
| 5,089,989 | 2/1992 | Schmidt et al. . |
| 5,387,767 | 2/1995 | Aron et al. . |
| 5,544,127 | 8/1996 | Winkler . |
| 5,597,042 | 1/1997 | Tubel . |
| 5,640,371 | 6/1997 | Schmidt et al. . |
| 5,796,677 | 8/1998 | Kostek et al. ............................ 367/25 |

FOREIGN PATENT DOCUMENTS

WO 93/07514   4/1993   WIPO .

OTHER PUBLICATIONS

"Sonic compressional Measurements While Drilling"; J. Aron, S.K. change, R. Dworak, K. Hsu, T. Lau, J.P. Mason, J. Mayes, G. McDaniel, C. Randall, S. Kostek, T.J. Plona; SPWLA, 35$^{th}$ Annual Logging Symposium , Jun. 19–22, 1994, pp. 1–17.

*Primary Examiner*—Michael Horabik
*Assistant Examiner*—Timothy Edwards, Jr.
*Attorney, Agent, or Firm*—Madan, Mossman & Sriram, P.C.

[57] ABSTRACT

This invention is directed toward apparatus and methods for obtaining acoustic measurements or "logs" of earth formations penetrated by a borehole. More particularly, the invention is directed toward obtaining the acoustic measurements while the borehole is being drilled. The downhole apparatus comprises a plurality of segmented transmitters and receivers which allows the transmitted acoustic energy to be directionally focused at an angle ranging from essentially 0 degrees to essentially 180 degrees with respect to the axis of the borehole. Downhole computational means and methods are used to process the full acoustic wave forms recorded by a plurality of receivers. A two way communication system is also used in the preferred embodiment of the invention.

24 Claims, 7 Drawing Sheets

MEASUREMENT-WHILE-DRILLING ACOUSTIC SYSTEM EMPLOYING MULTIPLE, SEGMENTED TRANSMITTERS AND RECEIVERS

This application is a continuation of application Ser. No. 08/371,879, filed Jan. 12, 1995, now abandoned.

This invention is directed toward apparatus and methods for obtaining acoustic measurements or "logs" of earth formations penetrated by a borehole. More particularly, the invention is directed toward obtaining the acoustic measurements while the borehole is being drilled. In addition, the downhole apparatus comprises a plurality of segmented transmitters and receivers which allows the transmitted acoustic energy to be directionally focused at an angle ranging from essentially 0 degrees to essentially 180 degrees with respect to the axis of the borehole.

BACKGROUND OF THE INVENTION

Acoustic measurements have been used in wireline borehole logging for the past four decades. The first wireline acoustic instruments or "tools" were single transmitter and receiver devices which were used to measure the velocity of the first arrival component of an acoustic wave pulse transmitted through the penetrated formation. This component was usually the compressional or "p" wave component. The velocity measurement, or more precisely the travel time of the wave component from the transmitter to the receiver, was used to compute formation porosity in formation evaluation applications. In addition, early acoustic logs were used in the conversion seismic data, initially measured in the time domain, into the depth domain thereby yielding cross sectional displays of geological structure used in the industry as a guide to exploration and development drilling.

During the late 1960s and early 1970s, acoustic wireline devices became more complex and also yielded additional information. In the area of formation evaluation, multiple transmitters and receivers were introduced to reduce the adverse effects of the borehole upon the formation acoustic measurements. In the late 1970s, as the transmission rates of wireline telemetry systems increased, the full wave form of the received signal, rather than just the first arrival time, was measured at a plurality of receivers spaced axially along the primary axis of the logging tool. The analog signals were digitized downhole and digitized wave forms were transmitted to the surface for processing. Processing involved the extraction of the travel times of the compressional and shear components, as well as various tube wave components. In addition, the amplitudes of the various wave train components were determined. In formation evaluation, the full wave form information was used to obtain a more accurate and precise measure of formation "acoustic" porosity. In addition, mechanical properties of the formation were determined by combining amplitudes of the various components of the measured acoustic wave form. This information was used to optimize subsequent drilling programs within the area, to aid in the design of hydraulic fracturing programs for the drilled well, and to greatly increase the accuracy and precision of the conversion of area seismic data from the time into the depth domain.

During this same time period, multiple types of logging sensors were beginning to be run in combination, and the measurements from the various types of sensors were combined to obtain formation evaluation information which exceeded the sum of information obtained from the response of each sensor. As an example, thermal neutron porosity sensors, scattered gamma ray sensors, and acoustic sensors were run in combination. Each sensor yielded an indication of formation porosity. By combining the responses of the three types of sensors, a more precise and accurate measure of porosity was obtained. In addition, information concerning the lithology of the formation was obtained which could not be obtained from the responses of any of the individual sensors.

Much effort in the design of acoustic wireline logging tools was, and today still is, directed toward the minimization of acoustic energy transmitted directly through the body of the downhole instrument. The arrival of this energy component at the receiver or receivers usually occurs before the arrival of energy whose path traverses the formation and the borehole. The travel path is more direct and therefore shorter. In addition, the body of the tool is usually metallic and exhibits a faster acoustic travel time than the formation and the borehole. Since the latter arrivals contain parametric information of interest, the former is considered to be interference or "noise". This direct component is reduced and/or delayed by using a variety of techniques. The component is reduced by acoustically isolating transmitters and receivers from the tool body as much as possible. The arrival of this component is delayed, preferably until after the arrival of components from the formation and borehole, by increasing the effective travel path by cutting a series of alternating slots in the metallic tool body between the transmitter and receiver arrays. This portion of the tool body is commonly referred to as the isolation subsection or "isolator sub". In addition, various mathematical techniques have been used in the processing of full wave form data to remove the direct component of the received wave form.

In addition to noise generated by the direct transmission of acoustic energy through the wireline tool body, additional acoustic noise is generated as the tool is conveyed along the borehole wall. This noise is commonly referred to as "road noise". The adverse effects of road noise are minimized using mechanical and mathematical techniques. The prior art teaches the use of many types of roller mechanical devices whereby the wireline tool is "rolled" rather than "dragged" along the borehole wall thereby reducing the magnitude of the road noise. In addition, since road noise is essentially incoherent, various mathematical methods are used in the processing of full wave form data to greatly reduce the effects of road noise.

The previous discussions have been directed to wireline type measurements wherein the measurements are usually made after the borehole has been drilled. In some drilling operations, wireline logs are made intermittently during the drilling operation, but such logging usually requires that the drill string be removed from the borehole prior to logging. Logging after completion of the drilling operation often reveals that the target formation or formations have been missed by perhaps either drilling too shallow or too deep. In addition, unexpected zones, such as high pressure formations or salt zones, can be encountered during, and adversely affect, the drilling operation. Such encounters can be quite costly and can be fully analyzed with wireline logging only after the encounter. Intermediate logging is likewise costly in that the drilling operation must cease during logging operations. Furthermore, the time interval between the termination of drilling and wireline logging allows the drilling fluid to penetrate or "invade" the near borehole formation thereby possibly introducing error in wireline log measurements. The adverse effects of invasion poses a particularly serious problem for wireline logs with relatively shallow depths of investigation such as most nuclear logs. Possible damage to the borehole can occur during logging and costly drilling rig time and logging equipment time is wasted during stand-by periods for each operation.

Many of the problems discussed above can be overcome by measuring various formation evaluation and other parameters during the actual borehole drilling operation. This is particularly true with acoustic measurements since they not only represent a key formation evaluation measurement but also represent a key seismic tie-in measurement. The problems associated with intermittent logging are essentially eliminated. The need for wireline logging after the drilling can also be eliminated in some cases. Formation evaluation type measurements-while-drilling (MWD) logs can indicate to the driller, in real time, when anomalies such as a fault planes or formation lenses are being penetrated. This is particularly true if the MWD device has a relatively large depth of investigation and if the sensor can make measurements ahead of the drill bit. Such measurements can also indicate to the driller that high pressure formations or salt zones are being penetrated thereby allowing time for remedial steps such as adjusting the weight and salinity of the drilling fluid to be made before these zones adversely affect the drilling operation. Real time measures of drilling dynamics data provide the driller with information concerning the efficiency of the drilling operation. Furthermore, borehole directional information combined with real-time formation evaluation parameters, offset wireline log data and possibly seismic data can be extremely useful in assisting the driller in reaching the targeted zone of interest. The MWD acoustic measurement meets, or contributed substantially to, all of the above criteria as will be discussed in following sections of this disclosure.

The economic, technical, operational and safety advantages of measuring geophysical parameters as well as drilling management parameters, during the actually drilling of the borehole, were recognized in the early 1950's. Commercial measurements-while-drilling (MWD) became available in the late 1970's and early 1980's. These measurements included directional information and a limited number of formation evaluation type services. Additional sensors and services have been added during the intervening time period. In many respects, the sophistication of the sensors are comparable to their wireline counterparts in spite of the harsh environment experienced in using such sensors in the drilling environment. It is feasible, at least in principle, to utilize multiple sensor combination measurement methods developed for wireline tools to obtain new and improved parametric measurements while drilling. Furthermore, it is feasible, in principle, to utilize additional sensors responding to drilling related parameters simultaneously with formation evaluation type sensors. In practice, however, several major problems exist as will be summarized in the following paragraphs.

Wireline acoustic technology has been particularly difficult to adapt to MWD applications. In addition to road noise generated by the drilling assembly dragging against the wall of the borehole, there is an additional source of noise generated by the rotation of the drill bit and the drill string. Further, the slotted isolation sub technique used to isolate transmitters and receivers in wireline applications can not be used in MWD applications in that such slots would mechanically weaken the MWD acoustic subassembly to the failing point. In addition, the previously described full wave wireline acoustic measurement generates tremendous amounts of digital data. These data exceed the telemetry rates and storage capacities of current MWD systems thereby eliminating the option of processing full wave acoustic data at the surface. This problem is compounded when other types of sensors, comparable in sophistication to corresponding wireline applications, are run in combination with full wave acoustic devices. As an example, it is not feasible using current MWD telemetry capacity to transmit simultaneously a plurality of full acoustic wave forms or gamma ray energy spectra or electromagnetic wave attenuation and phase shift data, or a combination thereof, to the surface for processing to determine parameters of interest at depth intervals sufficient to obtain the required vertical resolution of the penetrated formations. The simultaneous transmission of drilling management sensor information such as directional information, weight on the drill bit, and other non formation evaluation type measurements still further overloads current MWD telemetry transmission rates which are of the order of 2 to 60 bits per second. Furthermore, it is not feasible to store copious amounts of raw data downhole sensor data for subsequent retrieval and processing due to relatively limited storage capacity of current MWD systems. Acoustic and other MWD device used for making multiple formation and borehole evaluation type parametric determinations comparable to current wireline measurements require the computation of the desired parameters downhole, and the transmission of the computed parameters of interest to the surface. By using downhole computational and methods, the transmission requirements are reduced by orders of magnitude in that only "answers" are telemetered rather than raw data. This type of downhole computation is also applicable to other types of non formation evaluation type measurements such as signals indicative of the operational characteristics of the downhole equipment as well as measurements indicative of drilling direction and efficiency.

SUMMARY OF THE INVENTION

The current disclosure is directed toward a full wave acoustic MWD system which utilizes downhole processing to reduce the copious amounts of measured or "raw" data to parameters of interest, or "answers", which can be telemetered to the surface using current MWD telemetry capacity. The storage capacity of current MWD systems is likewise capable of storing parameters of interest for subsequent retrieval at the surface.

The downhole portion of the acoustic system comprises a plurality of transmitter sets spaced axially along an essentially tubular downhole subassembly. Each transmitter set further comprises a plurality of segmented transmitters spaced azimuthally around the outside diameter of the downhole subassembly. A plurality of receivers are spaced axially along the outside diameter of the downhole subassembly and are separated by an isolation portion of the subassembly such that the direct transmission of acoustic energy through the subassembly is attenuated. One or more of the axially spaced receivers can also comprise an array of receiving elements spaced azimuthally around the outside diameter of the subassembly. The downhole subassembly also comprises computing devices, data storage devices, telemetry elements, power supplies and control circuits as well as other types of sensors. The acoustic portion of the downhole subassembly comprising the acoustic transmitter and receiver arrays will hereafter be referred to as the acoustic subassembly. Drilling fluid is pumped from the surface downward through the drill string, through the acoustic subassembly and any other subassemblies run in combination, through the drill bit, and returned to the surface through the drill string-borehole annulus. The functions and circulation of the drilling fluid or "mud" are well known in the art. The design of the isolator portion of the subassembly is such that restrictions to the flow of drilling mud is minimal.

The physical arrangement and firing sequences of the segmented transmitters are such that acoustic energy can be directed or focused into the formation in a predetermined azimuth and axial direction. This feature of the invention allows acoustic parameters to be measured in selected regions in the vicinity of the downhole assembly. Regions to be investigated can be selected in real time by sending commands from the surface or, alternately, can be preselected. As an example, the segmentation of transmitters allows measurements to be made ahead of the drill bit thereby providing the driller with critical information concerning formations and structures that have not yet been penetrated by the drill bit. This aids the driller in adjusting the drilling program, in real time, to meet the predetermined objectives and avoid problems as discussed briefly in a previous section. As a second example, the circumferential spacing of transmitters permits the focusing of transmitted acoustic energy azimuthally to determine the distance to adjacent bed boundaries in horizontal or highly deviated wells thereby assisting the driller in maintaining the drill bit within the formation of interest. This is referred to as "geosteering". Because of the relatively deep depth of investigation of the acoustic measurements, these measurements can be used as reference data for other sensor types with relatively shallow depths of investigation, such as nuclear sensors, run in combination. As an example, acoustic measurements might indicate that the bed boundary of a particular type of formation lies a given distance ahead of the drill bit. This reference information can be used to optimize the response parameters of shallower investigating sensors. In particular, data processing algorithms for shallow investigating sensors might be adjusted and tailored to yield optimum responses for the particular type of formation which is sensed by the deeper investigating acoustic measurement and will subsequently be penetrated and sensed by the shallow investigating sensors.

Because a plurality of axially and azimuthally spaced sets of segmented transmitters and a plurality of axially spaced receivers are employed, there are multiple paths within the three dimensional space in the vicinity of the device that received acoustic energy can traverse. Some of the receivers can also be segmented thereby further defining the traversion paths. These traversion paths or "ray paths" are somewhat analogous to data generated by three dimensional surface seismic source transmitter-receiver arrays or even more analogous to data generated by borehole seismic arrays in which the source is positioned at various positions of the earth and the receivers are positioned at variable depths within one or more boreholes. As in seismology, the full wave acoustic MWD system which will be detailed in this disclosure generates large amounts of raw data due to multiple ray paths and also due to the fact that full wave trains are measured at each receiver. Seismic interpretation techniques, which are available in the art, are suitable for the ray path analysis and interpretation of the MWD data. The processing, however, must be performed downhole since the volume of raw data exceeds existing MWD telemetering and storage capacity. As mentioned previously, the current invention comprises a downhole computer which reduces the raw data to parameter of interest, the volume of which does not exceed current MWD storage and telemetry capacity. Even though downhole processing is provided, parameters of interest must be selected judiciously. As an example, sufficient raw data and sufficient computing power exists to generate a three dimensional map in the vicinity of the drill bit of all geological structures which exhibit an acoustic impedance. It should be recalled that borehole acoustic devices as well as seismic operations respond to changes in acoustic impedance, where acoustic impedance of a material is defined as the product of the density of the material and the velocity of acoustic energy within the material. It would not be possible to telemeter or store a high resolution, three dimensional tabulation of coordinates of the impedance interface surfaces because of limitations of current MWD telemetry systems and storage capacities. It is, however, possible to telemeter or store some information concerning the detected interfaces such as the distance to the nearest interface, coarse coordinates of the interfaces, and the like.

The parameters of interest that can be provided by the disclosed MWD full wave acoustic system include formation evaluation parameters such as porosity. Additional parameters of interest include Poisson's ratio, elastic moduli, and other mechanical properties of the formation. In addition, integrated travel times over large vertical intervals can be measured. These parameters of interest have many uses which include detailed formation evaluations by combining acoustic measurements with other types of formation evaluation sensor measurements, pore pressure prediction, reservoir performance predictions, input data for the design of hydraulic fracture operations, input information for the selection of the optimum type of drill bit, geosteering and sand control. Parameters of interest can also be selected to more efficiently convert adjacent surface seismic measurements from the time domain to the desired depth domain.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of the invention and are therefore not to be considered limiting of its scope, for the invention may admit to other equally effective embodiments.

DETAILED DESCRIPTION OF THE PREFERRED EMBODIMENT

Figures 1, 6:
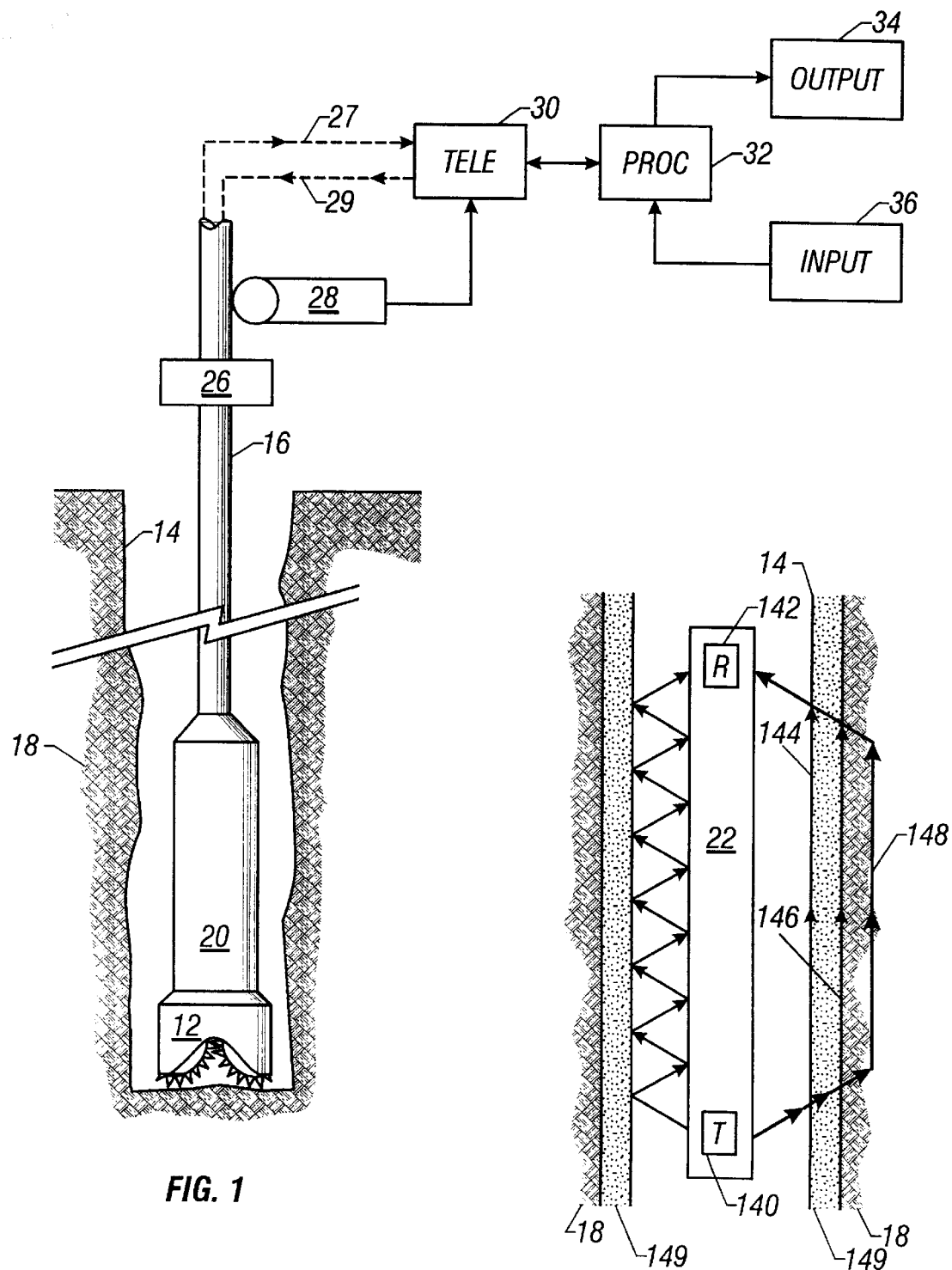
FIG. 1 illustrates an overview of a drilling rig which employs the apparatus of the current invention.
FIG. 6 depicts formation ray paths of the components of the measured full wave acoustic signal.

Attention is first directed to FIG. 1 which depicts the invention in relation to an MWD operation. The downhole subassembly 20 comprising the acoustic transmitter and receiver arrays is suspended within borehole 14 by the drill string 16. In the preferred embodiment, the downhole subassembly 20 is position as close as practical to the drill bit 12. The drill string is rotated by a kelly depicted by the numeral 26 thereby forming the borehole 14 which penetrates the earth formation 18. The power source to drive the kelly as well as many other components of the surface drilling rig are not shown in order to clearly disclose the key elements of the invention. Data are telemetered from the downhole subassembly to an uphole telemetry element 30. The telemetry system can comprise one or more types of drilling fluid or "mud" pulse systems which are well known in the art. The up link data telemetry path is indicated by the broken line 27. Data from the downhole subassembly 20 are received by the up hole telemetry element 30 and passed to a surface processor 32. The processor controls the output 34 such that the parameters of interest are recorded and displayed in the desired manner which is usually a plot of the parameters of interest as a function of depth within the borehole at which they are determined. The system can incorporate a two-way telemetry system which permits data and commands to be transmitted from the surface to the downhole subassembly while drilling. In this embodiment, the processor 32 also receives data from the input element 36 which is telemetered downhole through the drilling mud column by a down link telemetry path denoted by the broken line 29 to the downhole subassembly 20 by methods disclosed in the referenced application. The use of a two-way communication system is especially useful in changing operational parameters during the actual drilling operation. Such parametric changes might include the direction in which acoustic energy is focused and the specific parameters of interest to be telemetered to the surface or stored downhole. The processor 32 also receives depth information from the depth measure wheel and associated circuitry depicted by the numeral 28, thereby allowing the parameters of interest to be tabulated as a function of depth within the borehole 14 at which they were measured.

Figure 2:
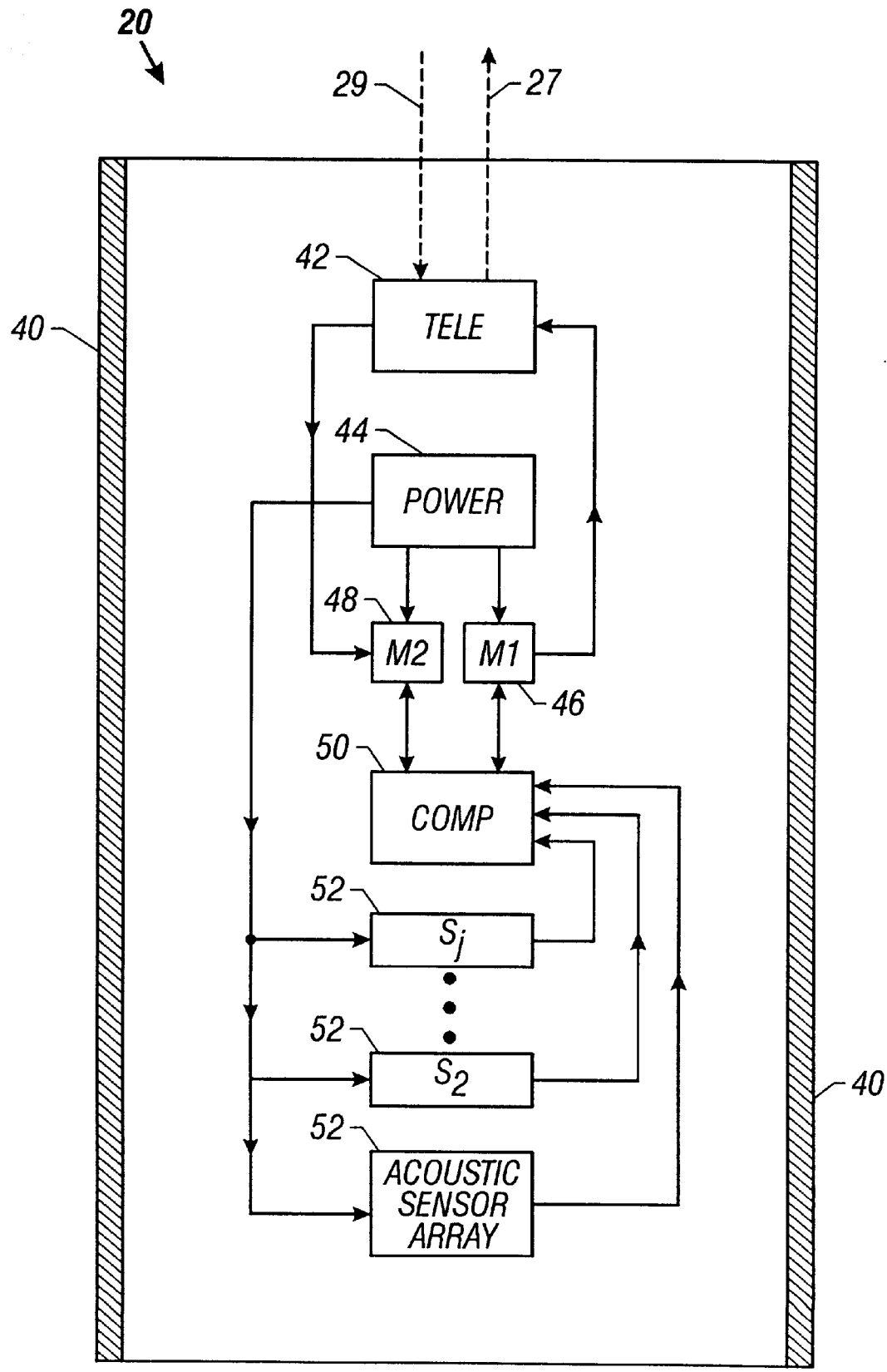
FIG. 2 presents a functional block diagram of the major downhole elements of the invention.

FIG. 2 illustrates, in functional block diagram form, the major elements of the downhole subassembly 20 and further illustrated with arrows the paths of cooperation between the various elements. The subassembly comprises a fluid tight housing 40 which shields the internal elements from tile harsh borehole environment. It should be understood that FIG. 2 illustrates only one physical arrangement of the elements and one system for cooperation between the elements. Other equally effective arrangements can be utilized to successfully embody the invention.

A plurality of j sensors of one or more types is arranged axially within the subassembly 20. The acoustic subassembly which comprises the acoustic array 60 is depicted as being the sensor array which is located closest to the drill bit 12. This location is preferred if the acoustic subassembly is used primarily to measure parameters ahead of the drill bit 12. It should be understood, however, that the acoustic sensor array can be located at a plurality of locations with respect to other types of sensors and elements within the downhole subassembly 20. Any additional sensor types such as nuclear, electromagnetic, directional and the like are identified as a group by the numeral 52. Directing attention to the acoustic sensor array 60, a predetermined number of discrete data points output from the sensors 60 are stored within a buffer which, in FIG. 2, is included as a partitioned portion of the memory capacity of the computer 50. Alternatively, the buffer storage means can comprise a separate memory element (not shown). Sensor response relationships or "models" for the acoustic sensor arrays or any other sensors run in combination are stored within memory unit 48. These models, which are used to transform measured sensor data into parameters of interest, are determined mathematically, or are determined by measuring the responses of the sensors in known test formations, or are determined by using a combination of both methods. In addition, other reference data such as data defining the targeted formation to be drilled can also be stored within the memory unit 48. A two way communication link exists between the memory 48 and the computer 50. The responses from sensors 52 are transmitted to the computer 50 wherein they are transformed into parameters of interest using methods which will be detailed in a subsequent section. The parameters of interest can be transmitted to the surface over the up link telemetry path 27 or stored within the memory 46 for subsequent retrieval at the surface. The acoustic sensor array 60 and any other sensors 52 run in combination are axially spaced within the downhole subassembly 20 and therefore do not exhibit the same measure point within the borehole 14. Prior to combination, raw sensor data must be shifted to a common reference point. Also, the sensors do not necessarily exhibit the same vertical resolution therefore requiring that vertical resolution matching be performed prior to combination using techniques known in the art. Once computed from the depth shifted and resolution matched raw data, the parameters of interest are then passed to the down hole portion of the telemetry system 42 and subsequently telemetered to the surface by a suitable up-link telemetry system illustrated conceptually by the broken line 27. The power sources 44 supply power to the telemetry element 42, the computer 50, the memory modules 46 and 48 and associated control circuits (not shown), and the sensors 52 and associated control circuits (not shown). Information from the surface is transmitted over the down link telemetry path illustrated conceptually by the broken line 29 to the downhole receiving element of downhole telemetry unit 42, and then transmitted to the storage unit 48 for subsequent use.

Figure 3:
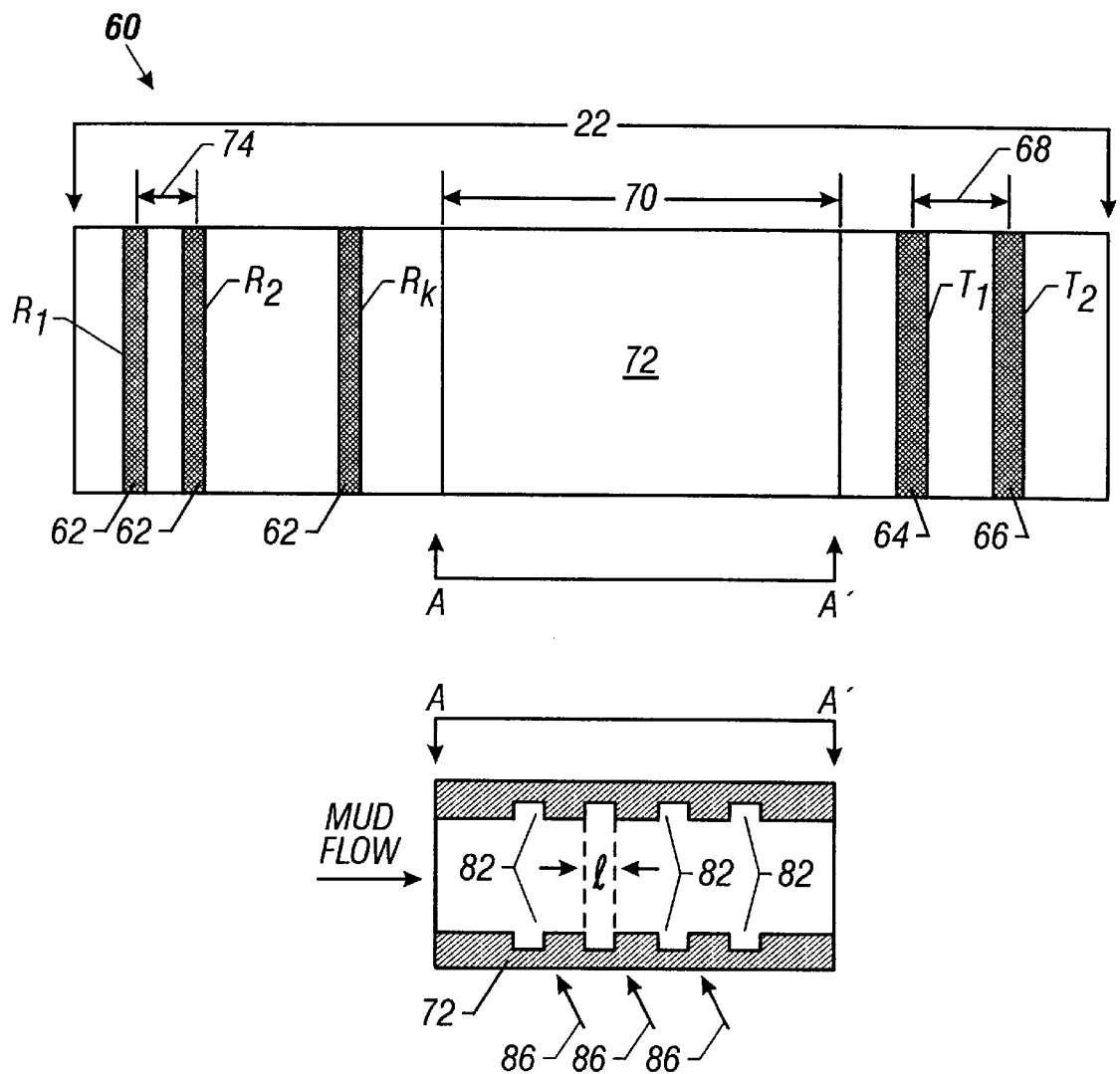
FIG. 3 illustrates a detailed view of the transmitter and receiver arrays of the acoustic subassembly.

A more detailed view of the acoustic sensor array 60 is shown in FIG. 3. Two segmented transmitter arrays are shown and designated as 64 and 66. The axial spacing between the two transmitter arrays is designated by the numeral 68 and is of the order of one foot in the preferred embodiment, although the spacing can be increased or decreased depending on the physical dimensions of the transmitters and the desired resolution of the measurement to be made. The number of transmitter arrays can be varied from one to three of four or even more depending upon the number of acoustic ray paths desired. Recall that each transmitter array comprise a plurality of segmented transmitters spaced circumferentially around the outside diameter of the essentially tubular acoustic subsection designated by the numeral 22. Details of the transmitter arrays will be presented in a subsequent section of the disclosure. The receivers are designated as a group by the numeral 62 and can vary in number, again dependent upon the number of acoustic ray paths desired. In FIG. 3, the number of receivers is designated generally as "k". Four to eight receivers are used in the preferred embodiment. Equal spacing between each receiver is designated by the numeral 74, although equal spacing is not a necessary condition for the embodiment of the invention. The preferred axial spacing between receivers is preferably about 6 inches although, as with the transmitter spacing, this dimension can be varied based upon the physical dimensions of the receivers and the desired resolution of the measurements.

It is noted that the transmitters and receivers do not have to be grouped as depicted in FIG. 3 in order to successfully embody the invention. As examples, the axial positioning of the elements could comprise four receivers spaced between two transmitters, or two transmitters spaced between two pairs of receivers, or alternating spacings of transmitters and receivers or, in principle, any axial combination of the selected number of transmitters and receivers. There are, however, physical, physics, and engineering criteria which govern somewhat the transmitter and receiver spacings. As mentioned previously, the physical dimensions of the elements are certainly factors in element spacing. Likewise, the basic physics principles that relate spacing to measurement resolution are likewise factors. Transmitter elements and their associated control circuitry are usually more complex than receiver elements and their associated circuitry. From and engineering perspective, it is desirable to minimize the number of transmitter elements and, when possible, to utilize common control circuitry for multiple transmitters. These engineering criteria, in turn, are important factors in the selection of element spacings.

The transmitter and receiver arrays as depicted in FIG. 3 are separated by an isolator portion 72 of the acoustic subassembly 22. In the preferred embodiment, the length 70 of the isolator portion is about 8 feet. An axial cross sectional view 80 depicts a series of groves or recesses 82 of length "l" cut on the inside diameter of the isolator portion 72. Drilling fluid flows through the isolator portion in a direction designated by the arrow 84. Each grove attenuates acoustic energy which passes directly through, or is reflected into, the isolator portion 72. This energy is considered to be "noise". The frequency of the energy attenuated is a function of the length l. Selective frequency attenuation can, therefore, be obtained by varying or "tuning" the lengths l. Multiple groves are employed for two reasons. First, each grove attenuates the acoustic energy of a selective frequency additively. That is, the larger the number of groves, the greater the damping of energy within the isolator portion 72. Next, the series of groves 82 attenuates acoustic energy that enters the isolator portion 72 by way of reflection from the borehole 14 or the formation 18. This reflected energy does not enter the isolator 72 at the end designated by the numeral 88, but enters the isolator at points neared the receiver arrays as illustrated by the arrows 86. While the groves 82 do introduce a pressure resistance in the flowing drilling mud stream, it has been found that this pressure resistance does not adversely affect the overall drilling operation. Slotted isolators are widely used in wireline acoustic devices to lengthen the effective flow path thereby attenuating direct transfer of acoustic energy between transmitters and receivers. The isolator slotting is not feasible in MWD applications in that the mechanical integrity of the isolator is weakened significantly by the slots.

If the transmitter and receiver elements are not grouped as depicted in FIG. 3 and previously discussed alternate spacings are employed, more than one isolator portion is preferred. As an example, if a plurality of receivers are spaced between two transmitters, it is preferable to use two isolator portions such that the receiver array is isolated from both transmitters. Regardless of the selected transmitter-receiver axial arrangement, it is preferable to employ sufficient isolator portions such that each receiver is axially isolated from each transmitter.

Figure 4A:
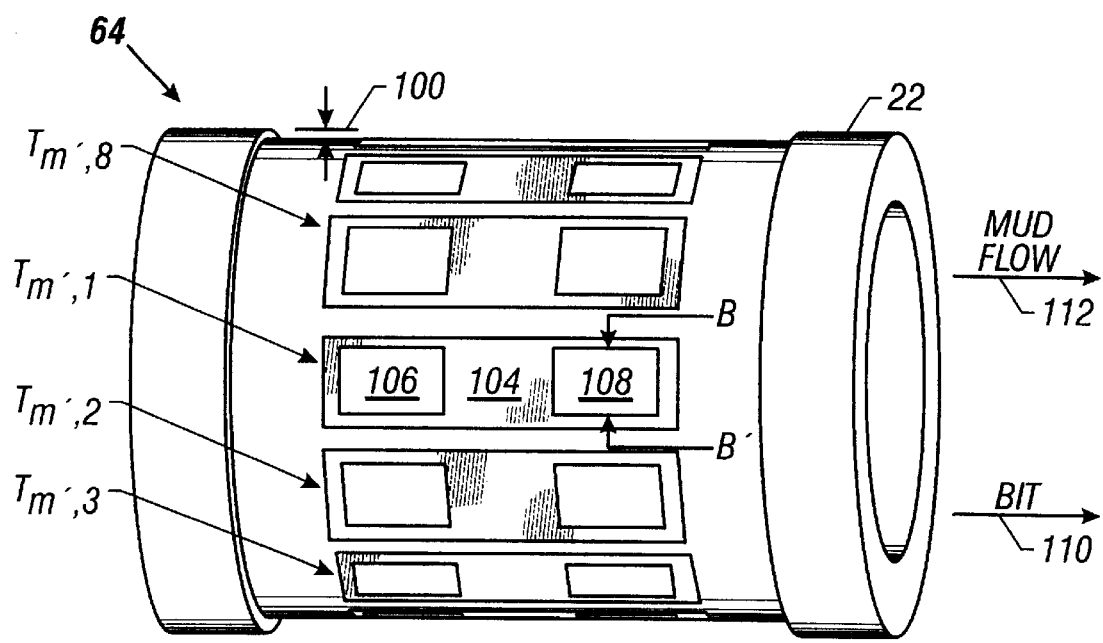
FIGS. 4a and 4b illustrate a detailed view of the elements of a transmitter array and the directional transmission features of the array.
Figure 4B:
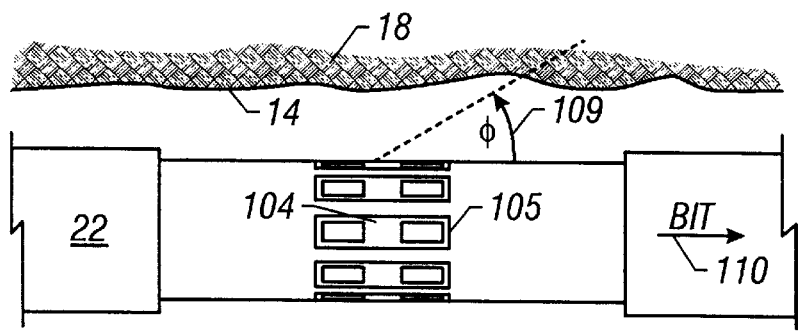

A more detailed view of the transmitter array 64 is shown in FIG. 4a. Elements designated as $T_{m',n'}$ are shown spaced azimuthally around the outside diameter of acoustic subassembly 22, where m'=1, . . . , m designates the number of the axially spaced array and n'=1, . . . , n designates the number of the azimuthally spaced element within the array m'. In FIG. 3, two transmitter arrays are shown therefore, for this example, m=2. For purposes of illustration, eight azimuthally spaced elements will be used for each axially spaced array therefore n=8 for both m'=1 and m'=2. It is preferred that arrays 64 and 66 be identical although this is not a necessary condition for the embodiment of the invention. The face of each transmitter element $T_{m',n'}$ is recessed a depth 100 within a recession 105 in the acoustic subassembly body 22. Each element also comprises two transmitting segments designated as 106 and 108 for the transmitter element $T_{m',1}$ in FIG. 4. For purposes of illustration, it will be assumed that all elements $T_{m',1}$, $T_{m',2}$, . . . , $T_{m',8}$ are identical. The segments 106 and 108 are embedded within a backing material 104 comprising Teflon or rubber or composite rubber compound or other suitable material which serves to acoustically isolate the transmitter segments 106 and 108 from the body of the acoustic subassembly 22. Each transmitter segment can comprise a piezoelectric assembly, a magnetostrictive assembly, a solenoid activated piston, or any suitable acoustic energy source suitable for use in the downhole environment. Piezoelectric devices are used in the preferred embodiment of the invention. For most types of transmitters, the dimension 126 is of the order of 1.0 to 1.5 inches.

Figure 5A:
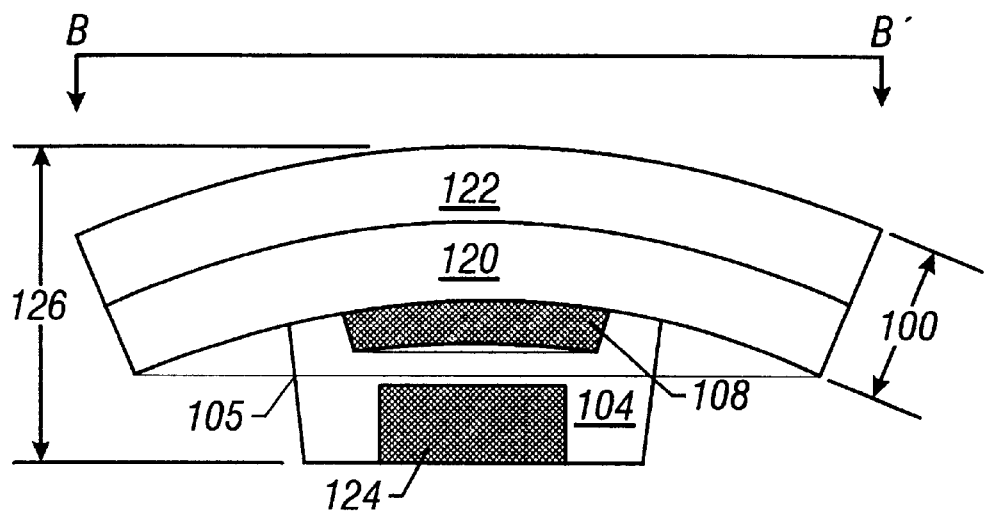
FIGS. 5a and 5b illustrate a cross sectional view of a transmitter element and the axial spacings of the transmitter elements about the outside diameter of the acoustic subassembly.

Additional details concerning the mounting of the transmitter element segments are shown in the cross sectional view B–B' in FIG. 5a. A cover sleeve 120 seals the face of the preferred piezoelectric transmitter device from the borehole environment. The material for the cover sleeve must be carefully selected to allow the transmission of acoustic energy. The cover sleeve 120 is covered with a slotted metallic hatch 122 through which acoustic energy is easily transmitted. The slotted hatch and sealed cover sleeves also fill the recess of depth 100 flush with the outside diameter of the acoustic subassembly 22. The inside diameter of the piezoelectric assembly is backed with the material 104 which tends to acoustically isolate the assembly from the subassembly 22 thereby reducing the direct transmission of acoustic energy to the receivers through the subassembly body. The material 104 is further backed by a recess filled with oil or other suitable material to provide for acoustic loading and thermal expansion of the assembly assembly.

Figure 5B:
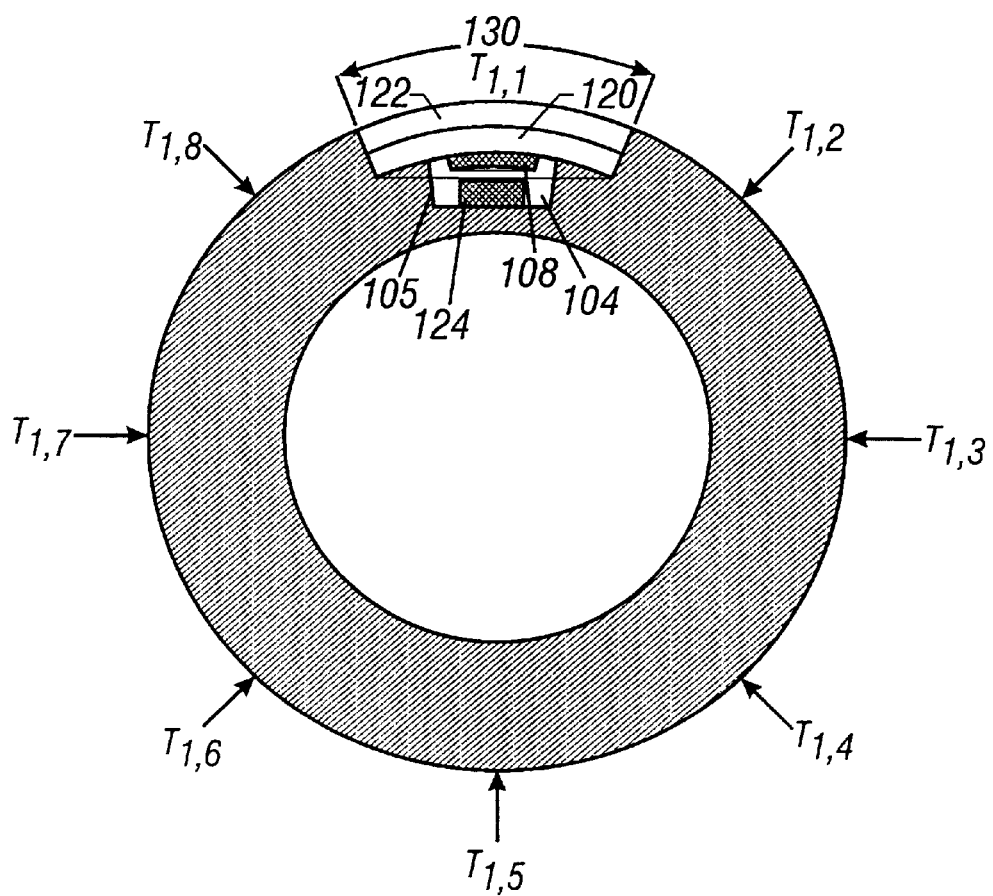

The locations of eight segmented transmitter elements spaced equally around the outside diameter of the acoustic subassembly 22 are shown in FIG. 5b. Only the transmitter element $T_{1,1}$ are shown in detail. The transmitter elements are identified using the previously defined terminology. Each transmitter element, upon firing, emits a pulse of acoustic energy into the borehole and formation. Because of the design of the transmitters, this energy tends to be focused radially into a sector defined by the position of the firing transmitter. Referring again to FIG. 5b, the firing of transmitter $T_{1,1}$ tends to direct acoustic energy into the sector identified by the numeral 130. Since eight transmitter elements are used in each example transmitter array, the sector 130 corresponds to an arc of 45°. By sequentially firing the n segmented transmitters of each transmitter array m in a predetermined or dynamically controlled manner, acoustic energy is focused radially into the formation thereby providing the desired azimuthal sensitivity of the acoustic measurement. It is highly desirable to fire the azimuthally spaced transmitters alternately such that transmitted energy is received from each firing with minimal interference from the previous firing. Using the example array depicted in FIG. 5b, transmitter $T_{1,1}$ is first fired followed by transmitter $T_{1,5}$ followed by transmitter $T_{1,2}$ followed by transmitter $T_{1,6}$ and so forth. Axial focusing of acoustic energy emitted by each transmitter element is obtained by timing the firing of each segment of each transmitter array. Referring again to FIG. 4a and also to FIG. 4b, if the element 106 is first fired followed by the firing of the element 108, the emitted acoustic pulses will constructively interfere such that the composite pulse is directed axially toward the drill bit as indicated by the arrow 110. The angle of maximum pulse amplitude, Ø, measured with respect to the major axis of the acoustic subsection and identified by the numeral 109, increases as the time differential Δt between segment firing decreases, where Δt is defined as the time of firing of segment 108 minus the firing of the segment 106. As example, if the firing of segment 108 lags the firing of segment 106 by a few microseconds ($\mu$sec), the angle Ø might be =45° indicating that the acoustic energy is axially focused ahead of the drill bit 12. The angle Ø of the focused energy can be varied by changing the magnitude of the time interval Δt. By using transmitter arrays which are azimuthally positioned and segmented, the acoustic energy from each firing can be focused at any direction within the three dimensional space in the vicinity of the acoustic subsection. The uses of this feature of the invention will be discussed in detail in a following section. It should be noted that the relationship between Ø and Δt is also a function of other parameters such as the spacing between the segments of the transmitter elements and the frequency w of the transmitted acoustic pulses.

The receiver array can comprise receiver elements spaced azimuthally around the outside diameter of the acoustic subassembly body 22 or can comprise only one element at a given azimuthal position thereby using the rotation of the drilling assembly to detect pulsed transmitted into the borehole at various radial angles. The preferred axial spacing between receiver arrays is approximately 6 inches. Shorter spacings can be used to maximize vertical bed boundary resolution. One or more of the receivers can be segmented thereby obtaining axial focusing through time gating of the receiver segments much in the same way as the previously described timed pulsing of the transmitter segments. As with the transmitters, the receivers are mounted such that acoustic coupling with the body of the subassembly 22 is minimized. The preferred embodiment comprises eight arrays with two arrays being segmented. The invention can, however, be embodied with any number of receiver arrays.

Suitable power, control and timing circuits (not shown) for the transmitters and receivers are mounted within the walls of the acoustic subassembly 22. The power requirement of the system is approximately 20 to 30 Watts. Suitable analog-to-digital (A/D) converters are includes in the receiver circuitry to convert the received analog wave trains for digital processing within the computing means 50. Downhole memory capacity, which includes the discrete memory units 46 and 48 and memory within the computing device, is somewhat variable but should exceed 5 MBytes for proper processing and storing of the raw data and the computed parameters of interest. Operating frequency is between 500 Hz and 20 KHz. The choice of operating frequency is somewhat dependent upon the specific application of the system. If the system is used to "look ahead" of the drill bit 12, then the frequency range should be selected to fall within the range of 1 to 5 KHz, with the lower frequency providing a greater depth of investigation but poorer spatial resolution of any acoustic impedance interfaces ahead of the drill bit. The choice of transmitter pulsed repetition rate is a function of the specific application of the system and is also a function of the selected operating frequency. Selection of higher frequencies permits the use of greater pulse repetition rates which yields higher resolution and more measurements per depth interval drilled. The trade-off is again a reduction in the depth of investigation of the measurement. It should be noted that operating frequency and pulse repetition rate can be changed while drilling by sending appropriate commands from the surface to the downhole subassembly by means of the down link communication path identified conceptually by the broken line 29 in FIG. 2. Transmitters can also be operated alternately at different frequencies in order to maximize both depth of penetration and resolution.

The disclosure now turns to the downhole processing of raw data to obtain parameters of interest which are either telemetered to the surface by the up_link communication path 29 shown in FIG. 2, or stored downhole within the memory unit 46, or both.

FIG. 6 illustrates a single transmitter element 140 and a single receiver element 142 within the acoustic subassembly 22. This embodiment will be used to define the various components of the measured wave train. The path 144 depicts acoustic energy that travels from the transmitter to the receiver through the material 149 which is either mud cake deposited during drilling or near-borehole formation damaged during drilling. The path 146 illustrates acoustic energy in the form of a compressional wave, or "p" wave, which travels from the transmitter to the receiver essentially along the interface between the material 149 and the formation 18. The path 148 illustrates acoustic energy in the form of a shear wave, or "s" wave, which travels within the formation 18 from the transmitter to the receiver. Acoustic waves which travel within the borehole are classified collectively as "guided" waves with a path illustrated by the numeral 152. These guided waves include tube, Stoneley and Rayleigh waves which are well known in the art. Any acoustic energy which travel from the detector to the receiver directly through the subassembly body 22 is not illustrated in FIG. 6. The defined wave types require different travel times to traverse the specified paths. Specifically, any wave component (not shown) transmitted directly to the receiver through the body of the subassembly 22 will arrive first followed by the p wave, the s wave and the tube waves. The p and s waves pass through the formation and are, therefore, the components of the measured full wave train which contain the desired parametric formation information. Stated another way, the p and s waves comprise the "signal" of the measured composite full wave train.

Figure 7A:
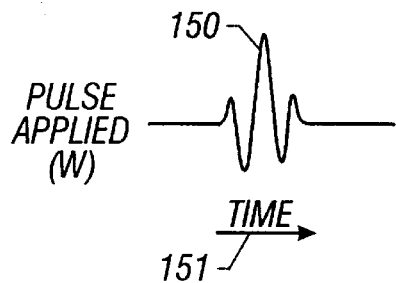
FIGS. 7a–7e show the analog form of the transmitted acoustic pulses, the received acoustic wave forms, and the various components of the received wave forms.
Figure 7B:
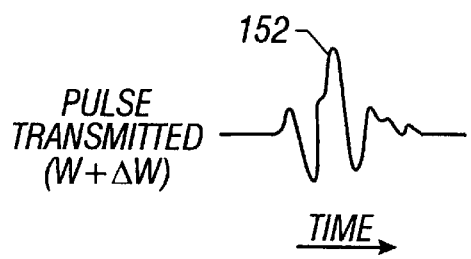
Figure 7C:
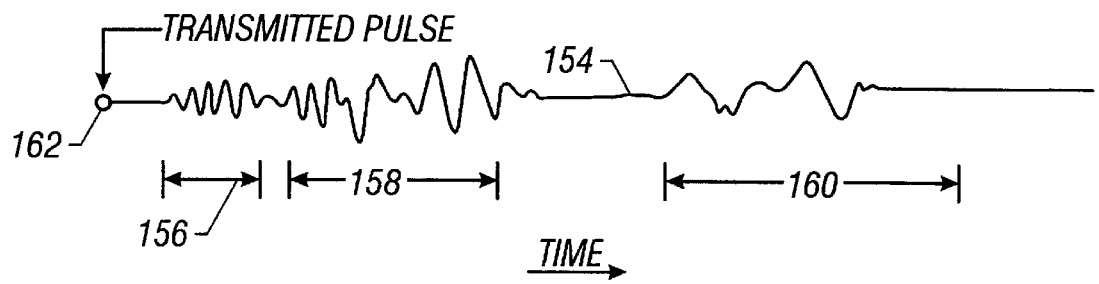
Figure 7D:
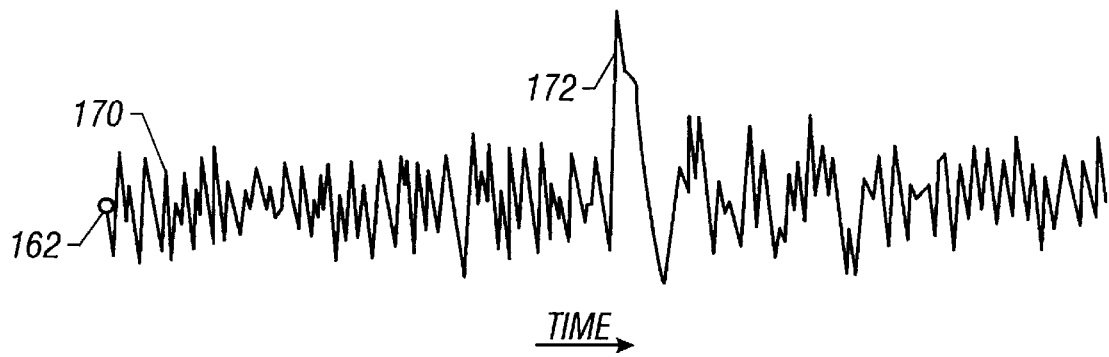
Figure 7E:
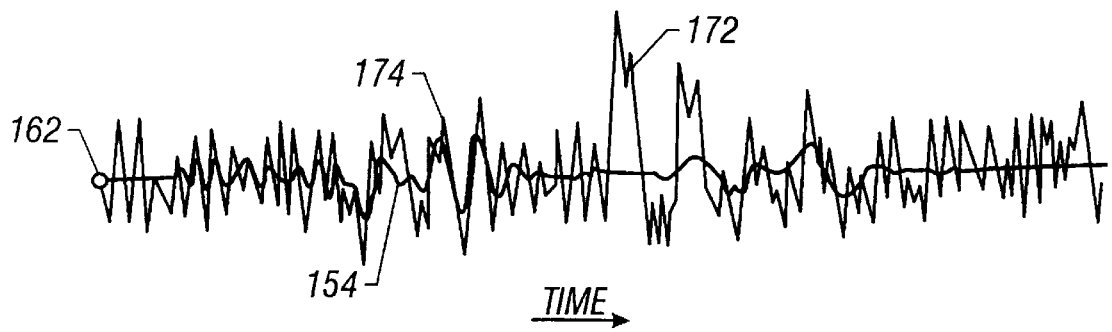

FIG. 7a illustrates the pulse 150 of frequency w, plotted as a function of time as indicated by the arrow 151, which is applied to the transmitter 140. There is "spreading" of the frequency components of the transmitted pulse as it enters the borehole and formation as depicted in FIG. 7b. The frequency will be essentially a Gaussian distribution about the applied frequency w with limits designated as +/−Δw. If, for example, the selected operating frequency is w=15 KHz, the limits of the frequency distribution might be Δw=+/−5 KHz. FIG. 7c illustrates the amplitude of a full wave train 154 recorded by the receiver 142 if there were no drilling noise present. The transmitter firing occurs at the time denoted by the numeral 162 and the p, s and tube wave arrivals occur within the time intervals 156, 158 and 160, respectively. In the actual operation of the system, drilling and road noise is present and the wave train actually recorded at the received 142 is depicted by the curve 170 of FIG. 7d. The curve 170 is actually a composite of the wave train 154 depicted in FIG. 7c and incoherent noise. The excursion 172 illustrates a rather large spike in the drilling noise. Since the wave form 154 contains the basic information of interest from which formation parameters are computed, the initial processing of the "raw" data curve 170 must include a device for either removing the noise or mathematically "canceling" the noise component. Seismology has addressed a similar problem for many years by algebraically adding or "stacking" a series for wave forms comprising essentially constant signal components and non coherent noise components. The noise components tend to algebraically cancel as more and more composite wave forms are stacked leaving only the desired signal component. In MWD operations, a number of composite wave forms measured at essentially the same position within the borehole are stacked thereby leaving only the desired signal component. There are other methods used in the art to remove the noise component. These methods include time correlation techniques and result in the deconvolution of the composite wave form to obtain the signal component 154 and the noise component 174 as illustrated in FIG. 7e. Regardless of the method selected, the composite wave form is first digitized by the previously mentioned A/D converters and then transferred to the downhole computer 50 for processing. Processing further includes the determination of the amplitudes and arrival times of the p and s wave components from which formation porosity, rock mechanical properties, and other previously discussed parameters of interest are determined. Once computed, the parameters of interest are transmitter to the surface by the up link telemetry path 27 or stored within the downhole storage unit 46 for subsequent retrieval.

Figure 8:
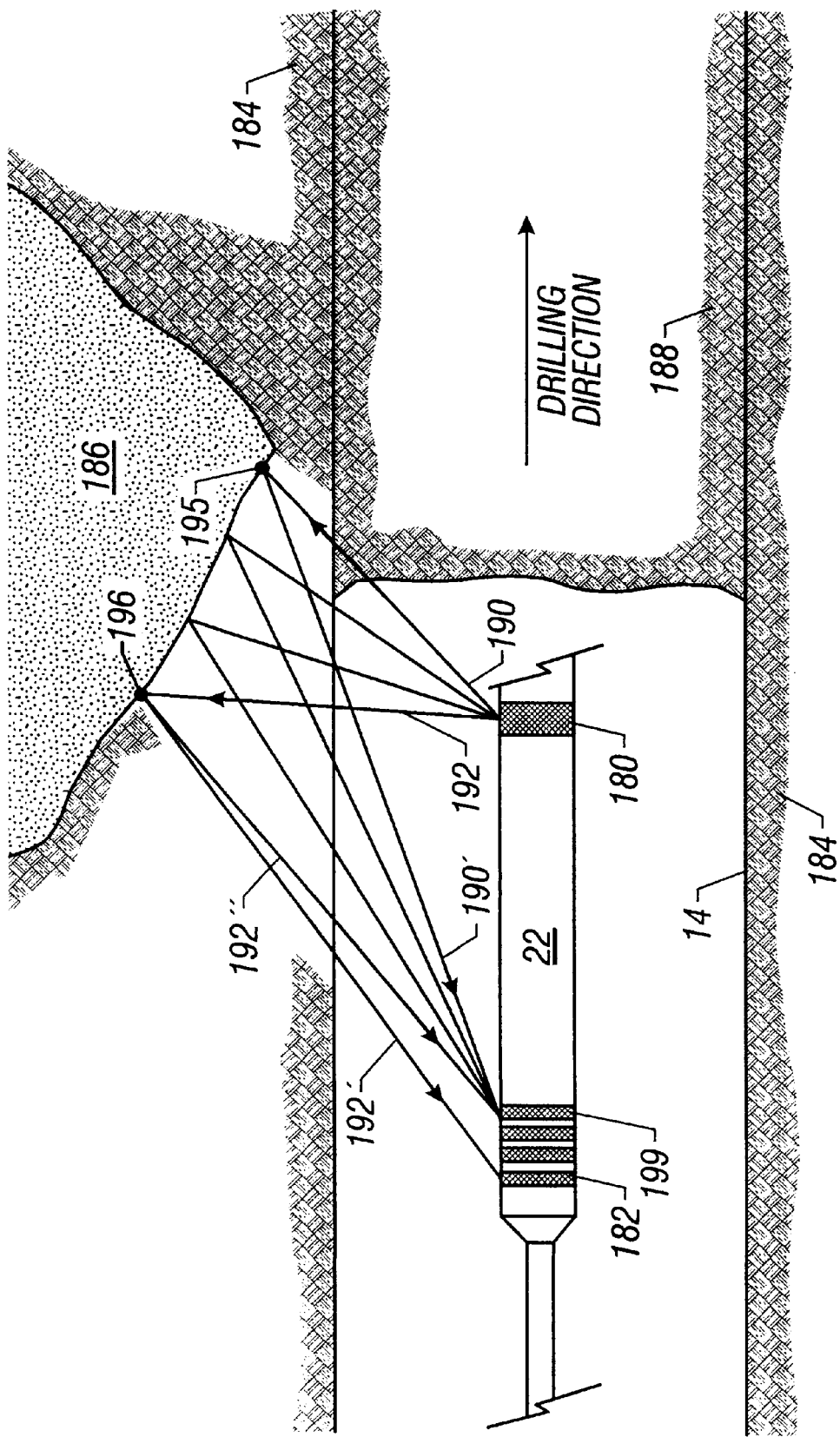
FIG. 8 illustrates an application of the invention wherein the boundaries of geological interfaces are made in a horizontal borehole drilling operation.

Turning now to a specific application, FIG. 8 illustrates a conceptual, two dimensional cross section sketch of a horizontal drilling operation in which the acoustic subassembly is employed. The borehole is again defined by the numeral 14 and the acoustic subsection is again identified by the numeral 22. For this example, the subsection is embodied with a single transmitter 180 and an array of four receivers of which two are specifically identified by the numerals 182 and 199. The drill bit (not shown) is penetrating horizontally a hydrocarbon bearing formation 184 along the predetermined path denoted by the numeral 188. A non hydrocarbon bearing formation identified by the numeral 186 is in the vicinity of the drill bit and it is obviously desirable to steer the drill bit around this formation. The first step in this operation is the "mapping" of the interface surface of the two formations. The second step is the transmission of commands from the surface to the bottom hole assembly thereby steering the drill bit such that the zone 186 is not penetrated. This example will address only the first step which is the mapping of the formation interface.

The segmented transmitter 180 is fired using apparatus and methods previously described such that acoustic energy is focused ahead of the drill bit. Based upon previous discussions, there are many transmitted and reflected ray or signal paths for the transmitted acoustic energy pulses. These ray paths encompass the entire three dimensional space in the vicinity of the drill bit. For purposes of illustration, only several of these ray paths will be discussed to illustrate, in general terms, the definition of the reflecting surface which is the formation interface. The acoustic energy represented by the ray 190 is transmitted ahead of the drill bit such that it strikes the impedance interface created by the interfacing formations at coordinates identified by the numeral 195. A portion of this energy is reflected at the location 195 and is returned to the receiver 199 by way of path 190'. Portions of the reflected energy are returned to all other recievers within the array by paths not illustrated. The measured travel time for the acoustic energy to traverse the paths 190 and 190' is a function of the position of the reflection point 195 and the known axial spacing between the transmitter 180 and the receiver 199. A second pulse of acoustic energy represented by the ray path 192 is likewise directed ahead of the bit but at a different angle such that it strikes the formation interface at coordinates identified by the numeral 196. A portion of this energy is reflected at point 196 and returned to the receiver array with specific ray paths to the receivers 199 and 192 being identified by the numerals 192' and 192", respectively. The measured travel times for the acoustic energy to traverse the paths 192–192' and 192–192" are functions of the position of the reflection point 196 as well as the known axial spacing between the transmitter 180 and the receivers 199 and 182. At this point, the analogy between the interpretation of the MWD acoustic data and three dimensional seismic data becomes clear. In three dimensional seismic data processing, the reflecting interface is mapped using measured acoustic travel times and the known positions of the seismic sources and receivers. In MWD acoustic data processing, the reflecting interface is mapped using measured travel times as a function of the known positions of the transmitters and receivers relative to the subassembly 22 (i.e. the fixed transmitter and receiver spacings). The absolute position of the subassembly is 22 is also known using directional data measured simultaneously with the acoustic data. Applying three dimensional seismic processing techniques known in the art to the measured three dimensional MWD ray path data yields a map of the interface surface of formations 184 and 186. By using additional transmitter and receiver rays, the interface surface can be mapped with greater accuracy and precision. A coordinate set of the interface is transmitter to the surface and serves as a reference for the driller. Based upon this interface map, the driller steers the drill bit, in real time, in the desired direction to bypassing non-commercial geological structures.

While the foregoing is directed to the preferred embodiments of the invention, the scope thereof is determined by the claims which follow.

What is claimed is:

1. A measurement-while-drilling (MWD) tool for use during drilling of a wellbore having a longitudinal axis in a formation having a reflecting interface, comprising:

(a) a tool body;

(b) a plurality of spaced apart transmitter arrays carried by the tool body, each said transmitter array containing a plurality of spaced apart transmitter elements circumferentially disposed about the tool body, each said transmitter element adapted to propagate acoustic energy into a formation surrounding the wellbore;

(c) at least one receiver axially spaced apart from the plurality of transmitter arrays on the tool body, said receiver detecting acoustic energy traveling through the formation in response to the acoustic energy transmitted by said transmitter elements; and (d) a processor, said processor selectively activating a plurality of the transmitter elements to focus acoustic energy into the formation in a selected direction towards the reflecting interface and processing the responses of the receiver to determine a parameter of interest.

2. The MWD tool according to claim 1, wherein the receiver array provides a full wave acoustic train resulting from the acoustic energy transmitted by the transmitter elements.

3. The MWD tool according to claim 1, wherein each transmitter element includes at least two equispaced segments axially spaced apart from each other and wherein the processor activates the segments of a transmitter element independently of each other.

4. The MWD tool according to claim 1, wherein the parameter of interest is selected from a group consisting of (i) acoustic travel time (ii) distance between the MWD tool and a boundary condition present in the formation; (iii) acoustic porosity of the formation, (iv) Poisson's ratio, (v) elastic modulii, (vi) a mechanical property of the formation surrounding the wellbore, (vii) integration of acoustic travel time over a vertical interval of the formation, (viii) location of a reflection point, (ix) a formation evaluation parameter, (x) pore pressure (xi) data for performing a hydraulic fracture operation, (xii) data for determining drill bit type for drilling of the wellbore, (xiii) a parameter for use in altering the drilling direction of the wellbore, (xiv) parameters for use in updating preexisting seismic maps, and (xv) a sand control parameter.

5. The MWD tool according to claim 1, wherein said transmitter elements are selected from a group consisting of (i) piezoelectric devices, (ii) magnetostrictive devices, and (iii) solenoid actuated devices.

6. The MWD tool according to claim 1, wherein the processor comprises a microprocessor that manipulates data downhole to determine the parameter of interest and a memory in which data is stored during the drilling of the wellbore.

7. The downhole tool according to claim 1 further comprising a telemetry system that transmits data from the MWD downhole to the surface.

8. The MWD tool according to claim 1, wherein the receiver includes at least one receiver array having a plurality of receiver elements circumferentially disposed around the tool body, each said receiver element receiving acoustic energy propagating through the formation in response to the acoustic energy transmitted by the transmitter elements.

9. The MWD tool according to claim 8, wherein the transmitter and receiver elements are selected from a group consisting of (i) elements having an outer curved surface, (ii) rod-shaped elements, (iii) round elements, and (iv) elements embedded into separate cavities within the tool body.

10. The MWD tool according to claim 1, wherein the reflecting interface is downhole of the tool.

11. The MWD tool according to claim 10, wherein the parameter of interest is selected from a group consisting of (i) acoustic travel time (ii) distance between the MWD tool and a boundary condition present in the formation; (iii) acoustic porosity of the formation, (iv) Poisson's ratio, (v) elastic modulii, (vi) a mechanical property of the formation surrounding the wellbore, (vii) integration of acoustic travel time over a vertical interval of the formation, (viii) location of a reflection point, (ix) a formation evaluation parameter, (x) pore pressure (xi) data for performing a hydraulic fracture operation, (xii) data for determining drill bit type for drilling of the wellbore, (xiii) a parameter for use in altering the drilling direction if the wellbore, and (xiv) parameters for use in updating preexisting seismic maps, and (xv) a sand control parameter.

12. The MWD tool according to claims 11, wherein the parameter of interest is selected from a group consisting of (a) acoustic travel time (b) distance between the MWD tool and a boundary condition present in the formation; (c) acoustic porosity of the formation, (d) Poisson's ratio, (e) elastic modulii, (f) a mechanical property of the formation surrounding the wellbore, (g) integration of acoustic travel time over a vertical interval of the formation, (h) location of a reflection point, (j) a formation evaluation parameter, (i) pore pressure (j) data for performing a hydraulic fracture operation, (k) data for determining drill bit type for drilling of the wellbore, (I) a geosteering parameter, and (m) parameters for use in updating preexisting seismic maps, and (n) a sand control parameter.

13. The MWD tool according to claim 1, wherein the plurality of transmitter arrays includes a first transmitter array and a second transmitter array.

14. The MWD tool according to claim 13, wherein each transmitter element in the first transmitter array has a corresponding transmitter element in the second transmitter array.

15. The MWD tool according to claim 13, wherein the processor activates the transmitter elements of the first and second transmitter arrays according to a predetermined order in a manner that discriminates against the propagation of acoustic energy in directions other than the selected direction.

16. The MWD tool according to claim 13, wherein the focused transmission of acoustic energy is obtained by the processor controlling the timing of activation of at least two said transmitter elements relative to each other.

17. A method of determining a parameter of interest during drilling of a wellbore, comprising:
   (a) conveying a measurement-while-drilling (MWD) tool in the wellbore, said MWD tool comprising a plurality of spaced apart acoustic transmitter arrays carried by a tool body, each of said plurality of transmitter arrays containing a plurality of spaced apart transmitter elements circumferentially disposed about the tool body, each said transmitter element adapted to propagate acoustic energy into a formation surrounding the wellbore;
   (b) activating the transmitter elements in said plurality of transmitter arrays in a preselected order in a manner that focuses acoustic energy into the formation in a selected direction;
   (c) detecting acoustic energy responsive to the transmitted energy and traveling through the formation by a receiver disposed spaced apart from said transmitter arrays and generating signals corresponding to the detected energy downhole; and
   (d) processing the generated signals downhole to compute a parameter of interest.

18. The method according to claim 17 wherein the parameter of interest is selected from a group consisting of (i) acoustic travel time (ii) distance between the MWD tool and a boundary condition present in the formation; (iii) acoustic porosity of the formation, (iv) Poisson's ratio, (v) elastic modulii, (vi) a mechanical property of the formation surrounding the wellbore, (vii) integration of acoustic travel time over a vertical interval of the formation, (viii) location of a reflection point, (ix) a formation evaluation parameter, (x) pore pressure (xi) data for performing a hydraulic fracture operation, (xii) data for determining drill bit type for drilling of the wellbore, (xiii) a parameter for use in altering the drilling direction of the wellbore, (xiv) parameters for use in updating preexisting seismic maps, and (xv) a sand control parameter.

19. A measurement-while-drilling (MWD) tool for use during drilling of a wellbore, comprising:
   (a) a tool body;
   (b) at least one acoustic transmitter carried by the tool body;

(c) a plurality of axially spaced apart receiver arrays axially spaced apart from the at least one transmitter along the tool body, each of said plurality of receiver arrays containing a plurality of spaced apart receiver elements circumferentially disposed about the tool body, each said receiver element adapted to provide a signal indicative of acoustic energy traveling through the formation; and (d) a processor carried by the tool body, said processor activating the transmitter to propagate acoustic energy into the formation and processing signals from the receiver elements to focus energy from a selected direction to determine a parameter of interest.

20. The MWD tool according to claim 19, wherein the receiver array provides a full wave acoustic train resulting from the activation of the transmitter elements.

21. The MWD tool according to claim 19, wherein the plurality of receiver arrays includes a first receiver array and a second receiver array.

22. The MWD tool according to claim 21, wherein the processor delays the signals from the elements of the first and second receiver arrays according to a predetermined order in a manner that discriminates against the propagation of acoustic energy in directions other than the selected direction.

23. A drilling system for drilling a wellbore, comprising:

(a) a rig;

(b) a drill string having a tubing with a drill bit at a bottom end thereof for drilling the wellbore;

(c) a bottom hole assembly uphole of the drill bit for determining a parameter of interest, said bottomhole assembly comprising:

(i) a tool body;

(ii) a plurality of acoustic transmitter arrays spaced axially along the tool body, each said transmitter array having a plurality of spaced apart transmitter elements circumferentially disposed about the tool body, each said transmitter element adapted to propagate acoustic energy into a formation surrounding the wellbore; and (iii) a receiver array axially disposed along the tool body spaced apart from the plurality of transmitter arrays, said receiver array having a plurality of spaced apart receiver elements circumferentially disposed about the tool body, each said receiver element providing signals in response to the acoustic energy received by such receiver element;

(d) a downhole processor in the bottomhole assembly, said downhole processor processing signals from the receiver elements to focus signals indicative of received energy from a specified direction and determining the parameter of interest during drilling of the wellbore; and (e) a computer at the surface, said computer receiving data from the downhole processor and in response thereto generating command signals relating to the drilling of the wellbore.

24. A measurement-while-drilling (MWD) tool for use during drilling of a wellbore having a longitudinal axis in a formation having a reflecting interface, comprising:

(a) a tool body;

(b) a plurality of spaced apart transmitter arrays carried by the tool body, each said transmitter array containing a plurality of spaced apart transmitter elements circumferentially disposed about the tool body, each said transmitter element adapted to propagate acoustic energy into a formation surrounding the wellbore;

(c) at least one receiver axially spaced apart from the plurality of transmitter arrays on the tool body, said receiver detecting acoustic energy traveling through the formation in response to the acoustic energy transmitted by said transmitter elements; and (d) a processor, said processor selectively activating a plurality of the transmitter elements to with a known time delay between said elements to focus acoustic energy into the formation in a selected direction towards the reflecting interface and processing the responses of the receiver to determine a parameter of interest.

* * * * *